(12) United States Patent
Shen

(10) Patent No.: US 8,738,876 B2
(45) Date of Patent: May 27, 2014

(54) METHOD FOR PERFORMING BLOCK MANAGEMENT, AND ASSOCIATED MEMORY DEVICE AND CONTROLLER THEREOF

(75) Inventor: Yang-Chih Shen, Taipei (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 383 days.

(21) Appl. No.: 13/180,565

(22) Filed: Jul. 12, 2011

(65) Prior Publication Data

US 2012/0173796 A1    Jul. 5, 2012

(30) Foreign Application Priority Data

Dec. 31, 2010 (TW) ................................ 99147197 A

(51) Int. Cl.
*G06F 13/00* (2006.01)
*G06F 3/06* (2006.01)
*G06F 12/02* (2006.01)

(52) U.S. Cl.
CPC .............. *G06F 3/0647* (2013.01); *G06F 3/067* (2013.01); *G06F 12/0246* (2013.01); *G06F 13/00* (2013.01)
USPC ........... 711/165; 711/166; 711/170; 711/133; 711/159

(58) Field of Classification Search
CPC ... G06F 3/0647; G06F 3/067; G06F 12/0246; G06F 13/00
USPC .......................... 711/165, 166, 170, 159, 133
See application file for complete search history.

(56) References Cited

U.S. PATENT DOCUMENTS

2001/0034809 A1*  10/2001  Ogawa ........................... 711/103
2010/0174845 A1*  7/2010   Gorobets et al. ............... 711/103

* cited by examiner

*Primary Examiner* — Midys Rojas
(74) *Attorney, Agent, or Firm* — Winston Hsu; Scott Margo

(57) ABSTRACT

A method for performing block management is provided, where the method is applied to a controller of a Flash memory that includes a plurality of blocks. The method includes: selecting a target block having a least erase count from at least one portion of blocks in a data region of the Flash memory, and utilizing the target block as a block to be erased, wherein serial numbers of the at least one portion of blocks correspond to order of last update of the at least one portion of blocks, respectively; and determining whether to move/copy valid data of the target block into a heavily worn block or a lightly worn block according to a serial number of the target block, where the degree of wear of the heavily worn block is higher than that of the lightly worn block. An associated memory device and a controller thereof are also provided.

17 Claims, 7 Drawing Sheets ns to access to a Flash memory,
METHOD FOR PERFORMING BLOCK MANAGEMENT, AND ASSOCIATED MEMORY DEVICE AND CONTROLLER THEREOF

BACKGROUND OF THE INVENTION

1. Field of the Invention

The present invention relates to access to a Flash memory, and more particularly, to a method for performing block management, and to an associated memory device and a controller thereof.

2. Description of the Prior Art

As technologies of Flash memories progress in recent years, many kinds of portable memory devices (e.g. memory cards respectively complying with SD/MMC, CF, MS, and XD standards) or solid state drives (SSDs) equipped with Flash memories are widely implemented in various applications. Therefore, the control of access to Flash memories in these memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of at least two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. In order to ensure that the access control of a memory device over the Flash memory therein can comply with related standards, the controller of the Flash memory should have some handling mechanisms in order to properly handle its data access operations.

According to the related art, the memory device having the aforementioned handling mechanisms may still suffer from some deficiencies. For example, the handling mechanisms of the related art cannot ensure that the best processing performance of a Flash memory can be achieved during a wear leveling operation. Therefore, a novel method is required for performing block management in order to adaptively select block(s) for keeping/storing valid data when an erasure operation is to be performed.

SUMMARY OF THE INVENTION

It is therefore an objective of the claimed invention to provide a method for performing block management, and to provide an associated memory device and a controller thereof, in order to solve the above-mentioned problems.

It is another objective of the claimed invention to provide a method for performing block management, and to provide an associated memory device and a controller thereof, in order to achieve the best processing performance during a wear leveling operation.

It is another objective of the claimed invention to provide a method for performing block management, and to provide an associated memory device and a controller thereof, in order to adaptively select block(s) for keeping/storing valid data of a target block when an erasure operation of the target block is to be performed.

According to a preferred embodiment of the claimed invention, a method for performing block management is provided. The method is applied to a controller of a Flash memory, wherein the Flash memory comprises a plurality of blocks. The method comprises: selecting a target block having a least erase count from at least one portion of blocks in a data region of the Flash memory, and utilizing the target block as a block to be erased, wherein serial numbers of the at least one portion of blocks correspond to order of last update of the at least one portion of blocks, respectively; and determining whether to move/copy valid data of the target block into a heavily worn block or a lightly worn block according to a serial number of the target block, wherein a degree of wear of the heavily worn block is higher than that of the lightly worn block.

While the method mentioned above is disclosed, an associated memory device is further provided. The memory device comprises: a Flash memory, wherein the Flash memory comprises a plurality of blocks; and a controller arranged to access the Flash memory and manage the plurality of blocks. In addition, the controller selects a target block having a least erase count from at least one portion of blocks in a data region of the Flash memory, and utilizes the target block as a block to be erased, wherein serial numbers of the at least one portion of blocks correspond to order of last update of the at least one portion of blocks, respectively. Additionally, the controller determines whether to move/copy valid data of the target block into a heavily worn block or a lightly worn block according to a serial number of the target block, wherein a degree of wear of the heavily worn block is higher than that of the lightly worn block.

While the method mentioned above is disclosed, a controller of a memory device is further provided. The controller is utilized for accessing a Flash memory, wherein the Flash memory comprises a plurality of blocks. The controller comprises: a read only memory (ROM) arranged to store a program code; and a microprocessor arranged to execute the program code to control the access to the Flash memory and manage the plurality of blocks. In addition, the controller that executes the program code by utilizing the microprocessor selects a target block having a least erase count from at least one portion of blocks in a data region of the Flash memory, and utilizes the target block as a block to be erased, wherein serial numbers of the at least one portion of blocks correspond to order of last update of the at least one portion of blocks, respectively. Additionally, the controller that executes the program code by utilizing the microprocessor determines whether to move/copy valid data of the target block into a heavily worn block or a lightly worn block according to a serial number of the target block, wherein a degree of wear of the heavily worn block is higher than that of the lightly worn block.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
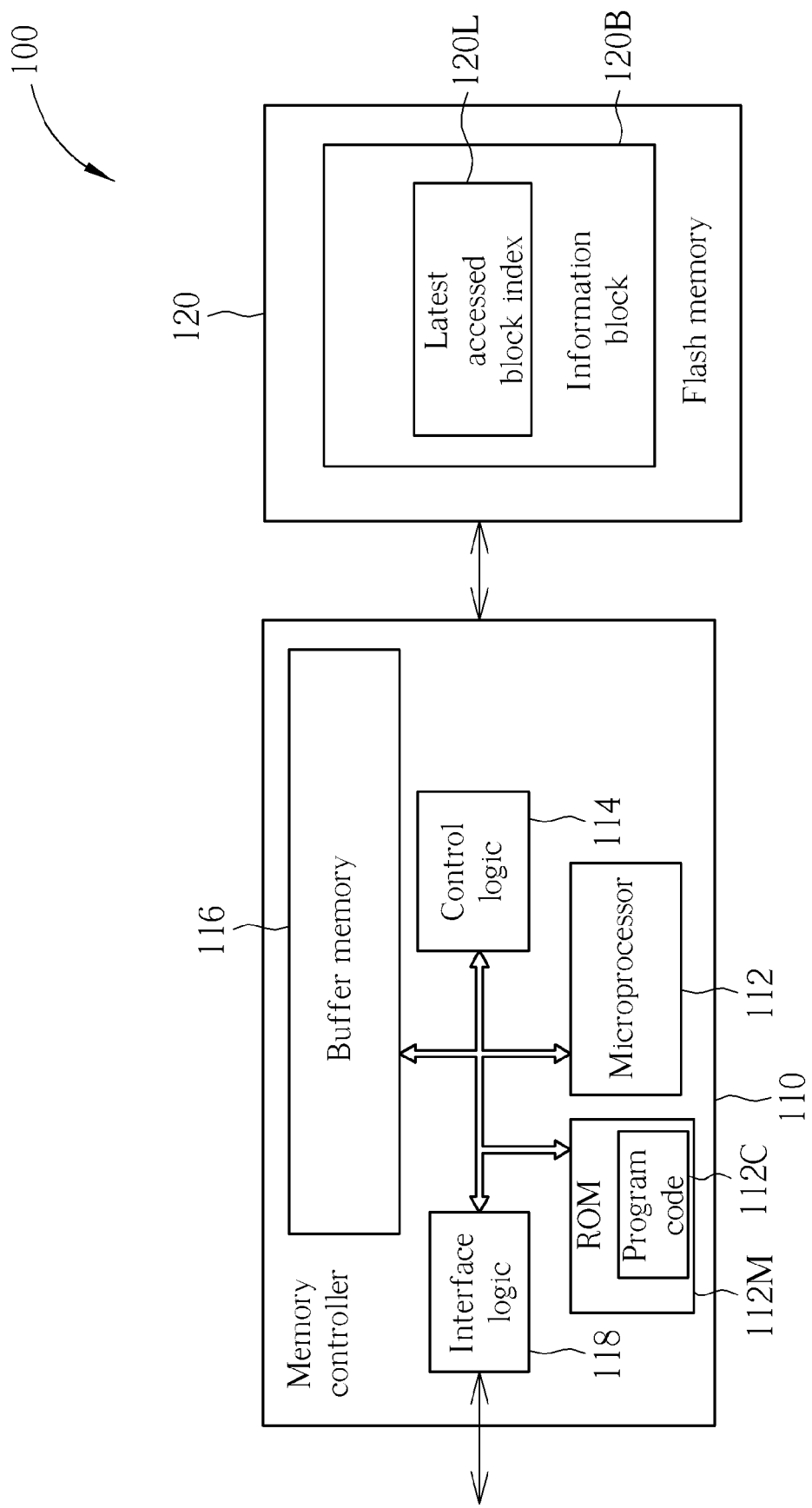
FIG. 1 is a diagram of a memory device according to a first embodiment of the present invention.

Please refer to FIG. 1, which illustrates a diagram of a memory device 100 according to a first embodiment of the present invention. In particular, the memory device 100 of this embodiment can be a portable memory device, examples of which may include, but not limited to, memory cards complying with SD/MMC, CF, MS, or XD standards. Here, the portable memory device is taken as an example of the memory device 100 in this embodiment. This is for illustrative purposes only, and is not meant to be a limitation of the present invention. According to a variation of this embodiment, the memory device 100 can be a solid state drive (SSD). Referring to FIG. 1, the memory device 100 comprises a Flash memory 120 comprising a plurality of blocks, and the plurality of blocks may comprise at least one information block 120B. The memory device 100 further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, at least one buffer memory 116, and an interface logic 118. In addition, the ROM 112M is arranged to store a program code 112C, and the microprocessor 112 is arranged to execute the program code 112C to control the access to the Flash memory 120. Please note that the program code 112C can be stored in the buffer memory 116 or any of various kinds of memories according to variations of this embodiment.

As shown in FIG. 1, the aforementioned at least one information block 120B is utilized for storing information regarding block management, and more particularly, at least one index such as the latest accessed block index 120L. The latest accessed block index 120L can be utilized for recording the latest accessed block within the Flash memory 120. For example, when programming/writing data into a certain block, the aforementioned controller (e.g. the memory controller 110 that executes the program code 112C by utilizing the microprocessor 112) can record/update the latest accessed block index 120L to indicate that this block is the latest accessed block. In another example, when updating a certain block, the controller can record/update the latest accessed block index 120L to indicate that this block is the latest accessed block. In this embodiment, the controller can store a previous version of the latest accessed block index 120L into the Flash memory 120, and store a copy version of the latest accessed block index 120L into the buffer memory 116, for use of dynamically updating the latest accessed block index 120L. In addition, the controller can store the latest version of the latest accessed block index 120L within the buffer memory 116 into the Flash memory 120, in order to replace the previous version of the latest accessed block index 120L. Please note that any information stored in the information block 120B can be stored within the memory controller 110 (e.g. in the buffer memory 116) or can be stored into any memory that can be accessed by the memory controller 110. Here, storing the latest accessed block index 120L in the Flash memory 120 is taken as an example in this embodiment, and is not meant to be a limitation of the present invention. As long as the implementation of the present invention is not hindered, the latest accessed block index 120L can be stored in any memory that can be accessed by the memory controller 110, no matter whether this memory is within or outside the memory controller 110.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to each Flash memory chip (e.g. operations of accessing at least one block or at least one page), utilizes the buffer memory 116 to perform buffering operations for the memory controller 110, and utilizes the interface logic 118 to communicate with a host device.

Figure 2A:
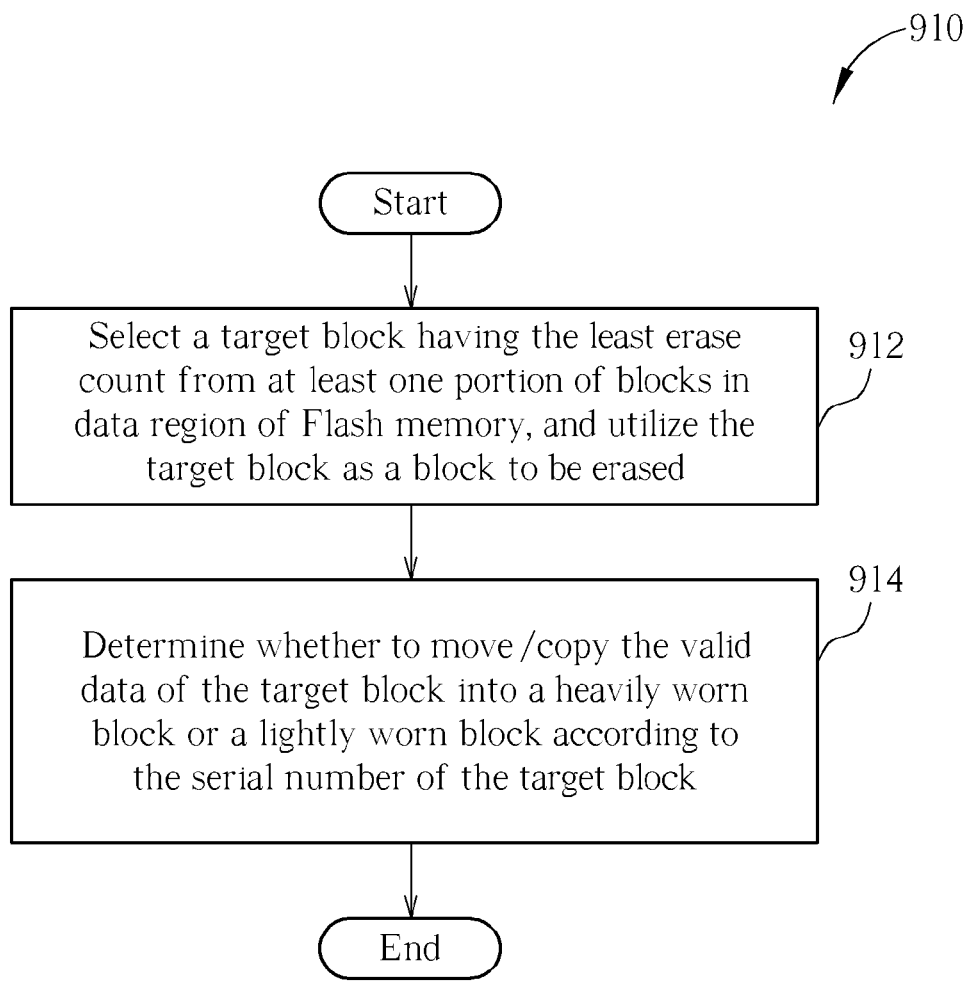
FIG. 2A is a flowchart of a method for performing block management according to an embodiment of the present invention.

According to this embodiment, in addition to accessing the Flash memory 120, the memory controller 110 is capable of properly managing the plurality of blocks mentioned above. More specifically, when an erasure operation is to be performed, the controller can adaptively select block(s) for keeping/storing valid data, in order to achieve the best processing performance of wear leveling. Referring to FIG. 2A, related details are further described as follows.

FIG. 2A is a flowchart of a method 910 for performing block management according to an embodiment of the present invention. The method can be applied to the memory device 100 shown in FIG. 1, and more particularly, the aforementioned controller (e.g. the memory controller 110 that executes the program code 112C by utilizing the microprocessor 112). The method is described as follows.

In Step 912, the controller selects a target block having the least erase count from at least one portion of blocks in a data region of the Flash memory 120 (e.g. a portion of blocks in the data region, or all blocks in the data region), and utilizes the target block as a block to be erased, where the serial numbers of the aforementioned at least one portion of blocks correspond to the order of the last update of the aforementioned at least one portion of blocks, respectively. Please note that, with regard to any block within the aforementioned at least one portion of blocks, in addition to the logical address thereof, this block further has a serial number, and this serial number corresponds to the order of update of this block, i.e. the update order of this block with respect to other blocks within the aforementioned at least one portion of blocks. According to this embodiment, the Flash memory 120 may further comprise a spare region. More particularly, a block belonging to the spare region is a block that has not been used since the latest erasure, and a block belonging to the data region is a block that has been used since the latest erasure, where the data region and the spare region represent (or correspond to) logical region division regarding the respective blocks of the Flash memory 120, rather than physical region division.

In Step 914, the controller determines whether to move/copy the valid data of the target block into a heavily worn block or a lightly worn block according to the serial number of the target block. Please note that the degree of wear of the heavily worn block is higher than that of the lightly worn block. More particularly, the heavily worn block represents a block having a higher degree of wear within the plurality of blocks, and the lightly worn block represents a block having a lower degree of wear within the plurality of blocks. In practice, the controller can calculate a difference Diff between the serial number of the target block and the serial number of a latest accessed block (e.g. the latest accessed block mentioned above), and determine whether to move/copy the valid data of the target block into the heavily worn block or the lightly worn block according to the difference Diff. For example, the controller compares the difference Diff with a threshold value to determine whether to move/copy the valid data into the heavily worn block. When the difference Diff reaches the threshold value, the controller moves/copies the valid data into the heavily worn block. In another example, the controller compares the difference Diff with a threshold value to determine whether to move/copy the valid data into the lightly worn block. When the difference Diff is less than the threshold value, the controller moves/copies the valid data into the lightly worn block.

According to an embodiment, such as a variation of the embodiment shown in FIG. 2A, the controller can determine whether the valid data of the target block is cold data (e.g. non-popular data) according to the serial number of the target block, in order to determine whether to move/copy the valid data into the heavily worn block, where when the difference Diff between the serial number of the target block and the serial number of the latest accessed block reaches a first threshold value TH1, the valid data is determined to be cold data, and the controller moves/copies the valid data into the heavily worn block in this situation. Thus, when moving/copying the valid data into the heavily worn block, the controller can record/update the latest accessed block index 120L to indicate that the heavily worn block is the latest accessed block.

In addition, the controller can determine whether the valid data of the target block is hot data (e.g. popular data) according to the serial number of the target block, in order to determine whether to move/copy the valid data into the lightly worn block, where when the difference Diff between the serial number of the target block and the serial number of the latest accessed block is less than a second threshold value TH2, the valid data is determined to be hot data, and the controller moves/copies the valid data into the lightly worn block in this situation. Thus, when moving/copying the valid data into the lightly worn block, the controller can record/update the latest accessed block index 120L to indicate that the lightly worn block is the latest accessed block. Additionally, any of the aforementioned first threshold value TH1 and the aforementioned second threshold value TH2 can be dynamically adjusted by the controller. In general, the first threshold value TH1 is greater than or equal to the second threshold value TH2.

Figure 2B:
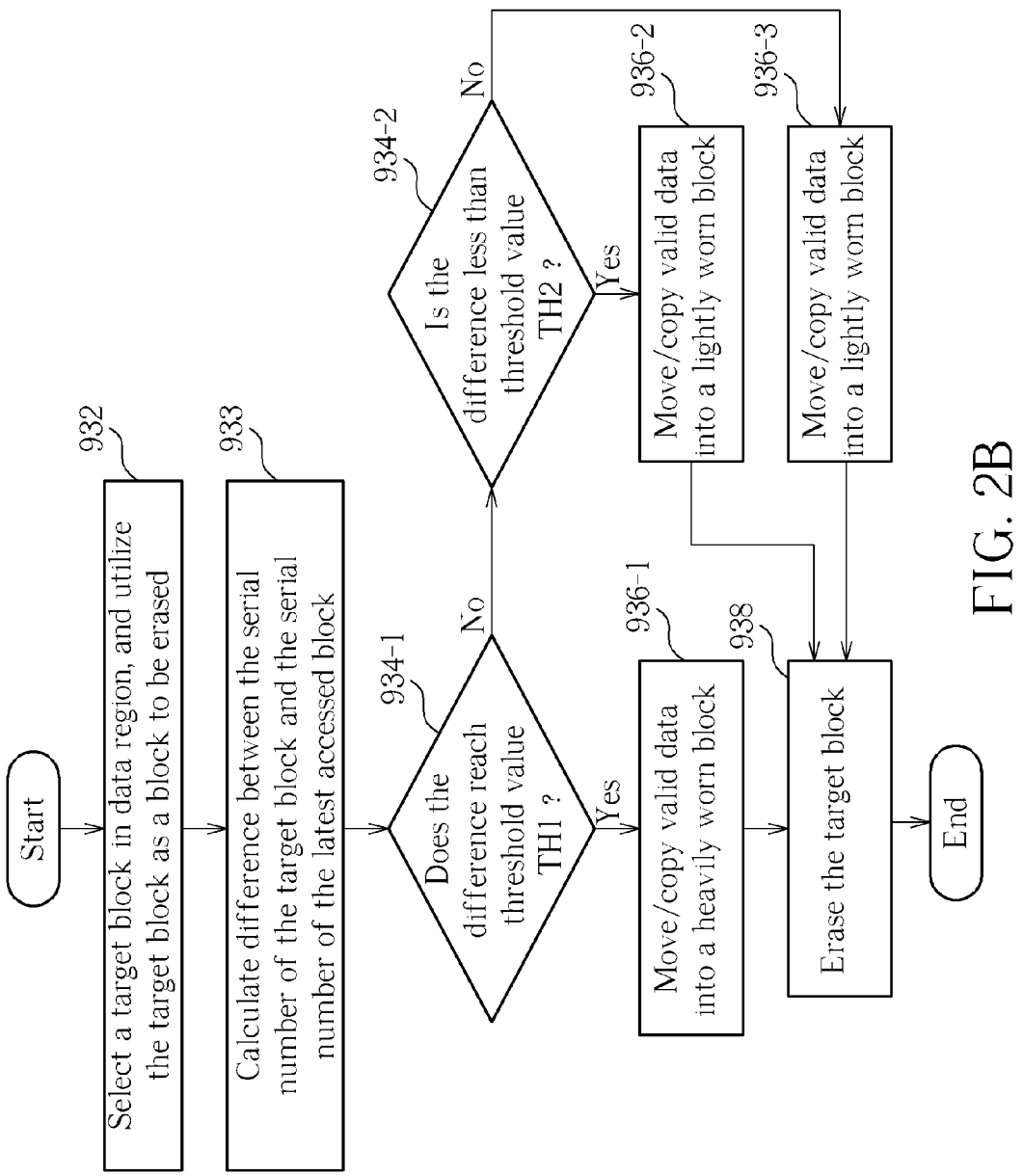
FIGS. 2B-2C respectively illustrate some implementation details of the method shown in FIG. 2A according to different embodiments of the present invention.

FIG. 2B illustrates some implementation details of the method 910 shown in FIG. 2A according to an embodiment of the present invention. The working flow shown in FIG. 2B is described as follows.

In Step 932, the controller selects a target block in the data region, such as the target block mentioned above, and utilizes the target block as a block to be erased.

In Step 933, the controller calculates the difference Diff between the serial number of the target block and the serial number of the latest accessed block.

In Step 934-1, the controller checks whether the difference Diff reaches the threshold value TH1. When it is detected that the difference Diff reaches the threshold value TH1, Step 936-1 is entered; otherwise, Step 934-2 is entered.

In Step 934-2, the controller checks whether the difference Diff is less than the threshold value TH2. When it is detected that the difference Diff is less than the threshold value TH2, Step 936-2 is entered; otherwise, Step 936-3 is entered.

In Step 936-1, the controller moves/copies the valid data into a heavily worn block such as the heavily worn block mentioned above.

In Step 936-2, the controller moves/copies the valid data into a lightly worn block such as the lightly worn block mentioned above.

In Step 936-3, the controller moves/copies the valid data into a lightly worn block, and more particularly, another lightly worn block selected according to different condition(s), rather than the lightly worn block mentioned in Step 936-2. In practice, the degree of wear of the other lightly worn block can be between that of the lightly worn block mentioned in Step 936-2 and that of the heavily worn block mentioned in Step 936-1.

In Step 938, the controller erases the target block.

According to an embodiment, such as a variation of the embodiment shown in FIG. 2B, the controller can divide the spare region mentioned above into at least three layers, such as a heavily worn block layer, an averagely worn block layer, and a lightly worn block layer. More particularly, the heavily worn block mentioned in Step 936-1 is selected from the heavily worn block layer, and the lightly worn block mentioned in Step 936-2 is selected from the lightly worn block layer, where the other lightly worn block mentioned in Step 936-3 can be regarded as an averagely worn block, and is selected from the averagely worn block layer.

In practice, the controller can classify any of the spare blocks (i.e. the blocks within the spare region) into one of the heavily worn block layer, the averagely worn block layer, and the lightly worn block layer according to the degree of wear of the spare blocks, where the degree of wear of a spare block in the heavily worn block layer is higher than that of a spare block in the averagely worn block layer, and the degree of wear of a spare block in the averagely worn block layer is higher than that of a spare block in the lightly worn block layer. For example, the controller can classify a spare block whose erase count falls within the range of the interval [13, 20] into the heavily worn block layer, and classify a spare block whose erase count falls within the range of the interval [7, 12] into the averagely worn block layer, and further classify a spare block whose erase count falls within the range of the interval [1, 6] into the lightly worn block layer. This is for illustrative purposes only, and is not meant to be a limitation of the present invention. According to some variations of this embodiment, the number of the respective layers in the spare region disclosed above can be varied and/or the ranges of the respective intervals disclosed above can be varied. According to one of these variations, in a situation where the number of the respective layers in the spare region is greater than three, the heavily worn block layer mentioned above can be referred to as the most heavily worn block layer, and the lightly worn block layer mentioned above can be referred to as the most lightly worn block layer, where the intervals associated to the respective layers are varied correspondingly, allowing the controller to classify the spare blocks in the spare region into the respective layers more accurately according to the degree of wear of the spare blocks. For example, based upon the order of the degree of wear (starting from the layer of the highest degree of wear), the layers may comprise: the most heavily worn block layer, the secondly heavily worn block layer, the thirdly heavily worn block layer, . . . , the averagely worn block layer, . . . , the thirdly lightly worn block layer, the secondly lightly worn block layer, and the most lightly worn block layer.

Figure 2C:
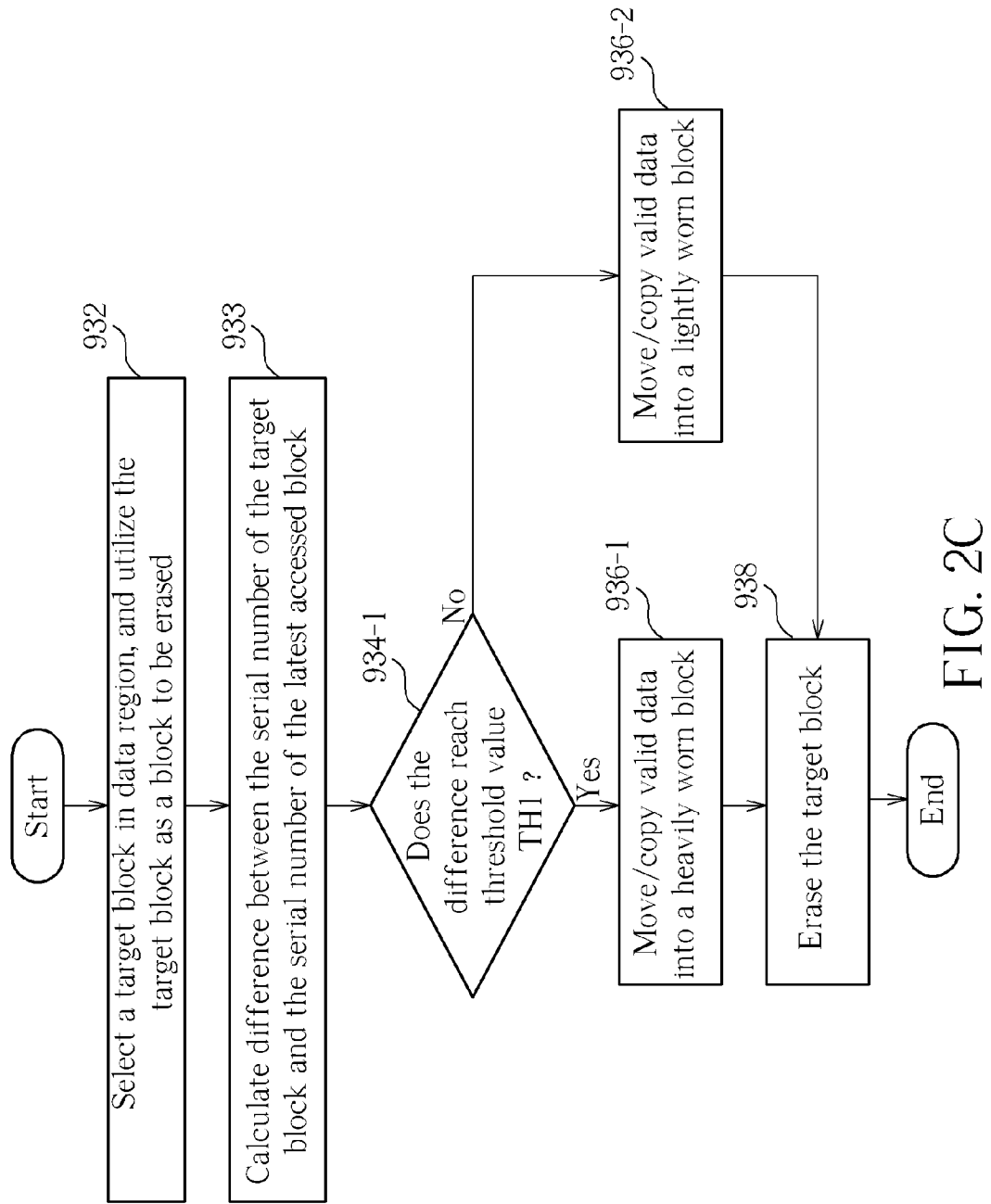

FIG. 2C illustrates some implementation details of the method 910 shown in FIG. 2A according to an embodiment of the present invention, where this embodiment is a variation of the embodiment shown in FIG. 2B. The working flow shown in FIG. 2C is described as follows.

In Step 932, the controller selects a target block in the data region, such as the target block mentioned above, and utilizes the target block as a block to be erased.

In Step 933, the controller calculates the difference Diff between the serial number of the target block and the serial number of the latest accessed block.

In Step 934-1, the controller checks whether the difference Diff reaches the threshold value TH1. When it is detected that the difference Diff reaches the threshold value TH1, Step 936-1 is entered; otherwise, Step 936-2 is entered.

In Step 936-1, the controller moves/copies the valid data into a heavily worn block such as the heavily worn block mentioned above.

In Step 936-2, the controller moves/copies the valid data into a lightly worn block such as the lightly worn block mentioned in Step 914.

In Step 938, the controller erases the target block.

According to an embodiment, such as a variation of the embodiment shown in FIG. 2C, the controller can dynamically adjust the threshold value TH1. When the erase count of the block to be erased (i.e. the target block that the controller selects from the data region in Step 932) is too great, for example, the erase count of the block to be erased is greater than the erase count threshold value $TH_E$, this means the erase count of the block is much greater than the average erase count of the data blocks (i.e. the blocks within the data region), the probability that the data stored in the block is hot data is very great. At this moment, the controller can dynamically increase the threshold value TH1, so the probability that the controller determines to enter Step 936-2 when checking whether the difference Diff reaches the threshold value TH1 in Step 934-1 can be greater, in order to ensure that the hot data can be moved to the lightly worn block mentioned in Step 936-2. Thus, the controller can dynamically adjust at least one threshold value such as the threshold value TH1, in order to change the probability that the valid data of the target block is moved/copied into the heavily worn block or the lightly worn block.

Figure 3:
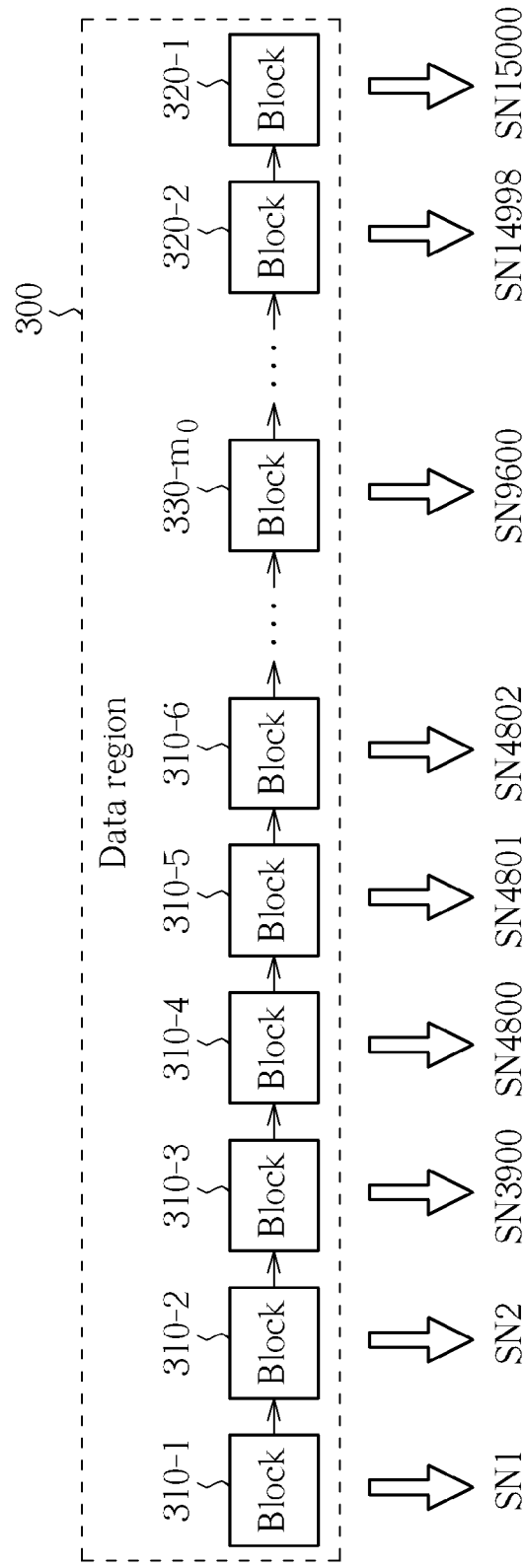
FIG. 3 illustrates some blocks of a data region involved with the method shown in FIG. 2A according to an embodiment of the present invention.

FIG. 3 illustrates some blocks of the data region 300 involved with the method 910 shown in FIG. 2A according to an embodiment of the present invention, where the arrows between these blocks represent the order of programming/writing or update, rather than physical connection relationships. In this embodiment, the serial numbers of the blocks {310-1, 310-2, 310-3, 310-4, 310-5, 310-6, . . . , 330-$m_0$, . . . , 320-2, 320-1} are {SN1, SN2, SN3900, SN4800, SN4801, SN4802, . . . , SN9600, . . . , SN14998, SN15000}, respectively. The connection relationships between the blocks shown in FIG. 3 are utilized for representing the order that the respective blocks within the data region 300 are stored. As shown in FIG. 3, the block that is latest programmed/written with data is the block 320-1, whose serial number is SN15000, and can be referred to as the tail of the block sequence. On the contrary, the block that is earliest programmed/written with data is the block 310-1, whose serial number is SN1, and can be referred to as the head of the block sequence. Regarding the order that the respective blocks are programmed/written, the programming/writing order of these blocks can be regarded as a set of link relationships, which is a set of logical connection relationships, rather than a set of physical connection relationships, where the set of link relationships can be referred to as a link. The set of logical connection relationships may be varied in response to the behavior that the host device randomly programs/writes data. Due to the behavior that the host device randomly programs/writes data, all data in a certain or some blocks in the link becomes invalid data (e.g. the host device is going to update the data, causing the old data in these blocks to become invalid data). And the controller will erase the blocks whose data becomes invalid data and logically move these blocks from the data region to the spare region. Additionally, the controller has to remove these blocks from the link, and re-establish the link. For example, when removing these blocks from the link, the controller re-establishes the link by logically connecting any two non-removed blocks that are adjacent to the same vacant position(s) of at least one removed block along the link (e.g. the same vacant position of a single removed block, or the same set of continuous vacant positions of some removed blocks). As a result, the serial numbers shown in FIG. 3 are not all continuous, for example, the serial number SN3900 comes after the serial number SN2 along the link, where the serial number SN3 through to the serial number SN3899 do not exist in the link at this moment. Please note that, in the beginning, it was not true that the serial number SN3 through to the serial number SN3899 do not exist in the link. For example, the data stored in the blocks respectively corresponding to the serial numbers SN3, SN4, . . . , and SN3899 became invalid data due to random write behaviors of the host device, and then the controller erased the blocks respectively corresponding to the serial numbers SN3, SN4, . . . , and SN3899 and logically moved these blocks from the data region to the spare region, and therefore, the controller removed the serial numbers SN3, SN4, . . . , and SN3899 of these blocks from the link, and re-established the link.

Please note that the notation SN of the above disclosed serial numbers can be omitted directly, while the values within the serial numbers can be kept, for being utilized during calculating the difference Diff. For example, in a situation where the threshold value TH1 is equal to 7500 and the threshold value TH2 is equal to 1024, the data in the blocks {310-$c$} such as the blocks {310-1, 310-2, 310-3, 310-4, 310-5, 310-6, . . . , 310-C} can be regarded as cold data (e.g. the data that is not frequently updated by the host device) since the differences {Diff} respectively corresponding to their serial numbers {SN1, SN2, SN3900, SN4800, SN4801, SN4802, . . . } (i.e. the differences {14999, 14998, 11100, 10200, 10199, 10198, . . . }) all reach the threshold value TH1. In addition, the data in the blocks {320-$h$} such as the blocks {320-1, 320-2, . . . , 320-H} can be regarded as hot data (e.g. the data that is frequently updated by the host device) since the differences {Diff} respectively corresponding to their serial numbers {SN15000, SN14998, . . . } (i.e. the differences {0, 2, . . . }) are all less than the threshold value TH2. Additionally, the data in the remaining blocks {330-$m$} such as the blocks {330-1, 330-2, . . . , 330-$m_0$, . . . , 330-M} can be regarded as medium data since the differences {Diff} respectively corresponding to their serial numbers (e.g. the difference 5400 corresponding to the serial number SN9600) fall within the range of the interval [TH2, TH1). This is for illustrative purposes only, and is not meant to be a limitation of the present invention. According to some variations of this embodiment, in a situation where the threshold value TH1 is equal to the threshold value TH2, the medium data mentioned above does not exist.

Figure 4A:
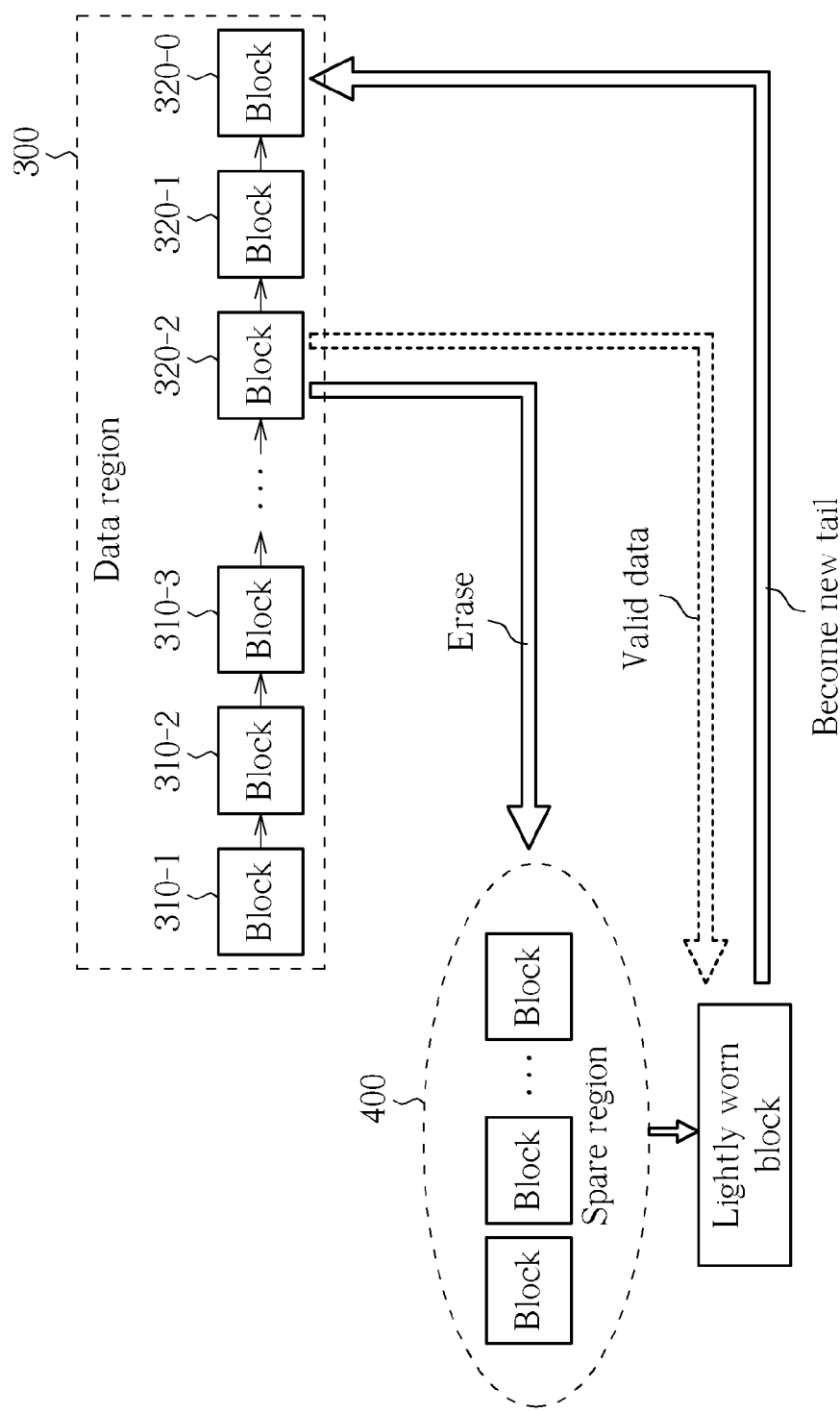
FIGS. 4A-4B respectively illustrate some implementation details of the method shown in FIG. 2A according to different embodiments of the present invention.
Figure 4B:
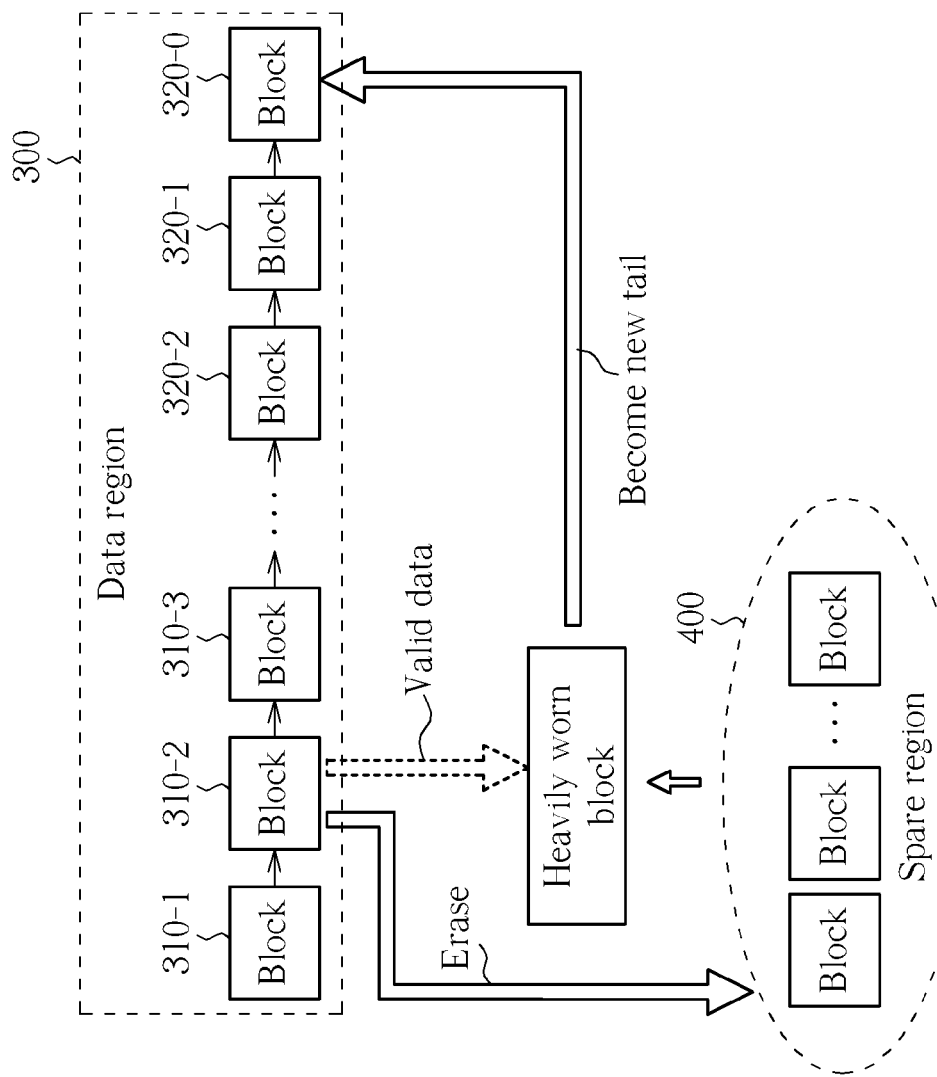

FIGS. 4A-4B respectively illustrate some implementation details of the method 910 shown in FIG. 2A according to different embodiments of the present invention.

As shown in FIG. 4A, the controller selects a block whose erase count is less than a threshold value TH3 from at least one portion of blocks within the spare region 400 of the Flash memory 120, for being utilized as the lightly worn block mentioned in Step 914, where the lightly worn block is not a block having the least erase count within the spare region 400 (e.g. the erase count of the lightly worn block is not zero). More particularly, the lightly worn block can be a block having a less erase count (except for the least erase count) within the spare region 400. In a situation where the target block is a hot block (i.e. a block comprising hot data) such as the block 320-2, the controller moves/copies the valid data into the lightly worn block, and after moving/copying the valid data, the controller erases the target block 320-2, and arranges the target block 320-2 to be within the spare region 400 logically. In addition, the controller arranges the lightly worn block to be within the data region 300 logically, causing the lightly worn block to logically become the new tail of the block sequence in the data region 300 shown in FIG. 3 (i.e. the new tail block 320-0 shown in FIG. 4A).

As shown in FIG. 4B, the controller selects a block whose erase count reaches a threshold value TH4 from at least one portion of blocks within the spare region 400 of the Flash memory 120, for being utilized as the heavily worn block mentioned in Step 914. More particularly, the heavily worn block can be a block having a more erase count (or the most erase count) within the spare region 400. In a situation where the target block is a cold block (i.e. a block comprising cold data) such as the block 310-2, the controller moves/copies the valid data into the heavily worn block, and after moving/copying the valid data, the controller erases the target block 310-2, and arranges the target block 310-2 to be within the spare region 400 logically. In addition, the controller arranges the heavily worn block to be within the data region 300 logically, causing the heavily worn block to logically become the new tail of the block sequence in the data region 300 shown in FIG. 3 (i.e. the new tail block 320-0 shown in FIG. 4B).

It is an advantage of the present invention that the block management implemented according to the present invention can distinguish hot data and cold data, and utilize the heavily worn block to store the cold data and utilize the lightly worn block to store the hot data, and therefore, can ensure that the best processing performance of a Flash memory can be achieved during a wear leveling operation. In contrast to the related art, in a situation where the chip area and the associated costs are not greatly increased, the present invention can achieve the goal of giving consideration to both operation performance and system resource management.

Those skilled in the art will readily observe that numerous modifications and alterations of the device and method may be made while retaining the teachings of the invention.

What is claimed is:

1. A method for performing block management, the method being applied to a controller of a Flash memory, the Flash memory comprising a plurality of blocks, the method comprising:
   selecting a target block having a least erase count from at least one portion of blocks in a data region of the Flash memory, and utilizing the target block as a block to be erased, wherein serial numbers of the at least one portion of blocks correspond to order of last update of the at least one portion of blocks, respectively; and
   determining whether to move/copy valid data of the target block into a heavily worn block or a lightly worn block according to a serial number of the target block, wherein a degree of wear of the heavily worn block is higher than that of the lightly worn block;
   wherein the step of determining whether to move/copy the valid data of the target block into the heavily worn block or the lightly worn block according to the serial number of the target block further comprises:
   calculating a difference between the serial number of the target block and a serial number of a latest accessed block; and
   determining whether to move/copy the valid data of the target block into the heavily worn block or the lightly worn block according to the difference.

2. The method of claim 1, wherein the step of determining whether to move/copy the valid data of the target block into the heavily worn block or the lightly worn block according to the serial number of the target block further comprises:
   comparing the difference with a threshold value to determine whether to move/copy the valid data into the heavily worn block.

3. The method of claim 2, wherein the step of determining whether to move/copy the valid data of the target block into the heavily worn block or the lightly worn block according to the serial number of the target block further comprises:
   when the difference reaches the threshold value, moving/copying the valid data into the heavily worn block.

4. The method of claim 1, wherein the step of determining whether to move/copy the valid data of the target block into the heavily worn block or the lightly worn block according to the serial number of the target block further comprises:
   comparing the difference with a threshold value to determine whether to move/copy the valid data into the lightly worn block.

5. The method of claim 4, wherein the step of determining whether to move/copy the valid data of the target block into the heavily worn block or the lightly worn block according to the serial number of the target block further comprises:
   when the difference is less than the threshold value, moving/copying the valid data into the lightly worn block.

6. The method of claim 4, wherein the step of determining whether to move/copy the valid data of the target block into the heavily worn block or the lightly worn block according to the serial number of the target block further comprises:
   comparing the difference with the threshold value to determine whether to move/copy the valid data into the heavily worn block.

7. The method of claim 1, further comprising:
   selecting a block whose erase count reaches a threshold value from at least one portion of blocks within a spare region of the Flash memory, for being utilized as the heavily worn block.

8. The method of claim 1, further comprising:
   selecting a block whose erase count is less than a threshold value from at least one portion of blocks within a spare region of the Flash memory, for being utilized as the lightly worn block, wherein the lightly worn block is not a block having a least erase count within the spare region.

9. The method of claim 1, further comprising:
   after moving/copying the valid data, erasing the target block.

10. The method of claim 1, wherein the step of determining whether to move/copy the valid data of the target block into the heavily worn block or the lightly worn block according to the serial number of the target block further comprises:

determining whether to move/copy the valid data of the target block into the heavily worn block or the lightly worn block according to the serial number of the target block and at least one threshold value; and dynamically adjusting the at least one threshold value, in order to change probability that the valid data of the target block is moved/copied into the heavily worn block or the lightly worn block.

11. A memory device, comprising:

a Flash memory, wherein the Flash memory comprises a plurality of blocks; and a controller arranged to access the Flash memory and manage the plurality of blocks, wherein the controller selects a target block having a least erase count from at least one portion of blocks in a data region of the Flash memory, and utilizes the target block as a block to be erased, and serial numbers of the at least one portion of blocks correspond to order of last update of the at least one portion of blocks, respectively;

wherein the controller determines whether to move/copy valid data of the target block into a heavily worn block or a lightly worn block according to a serial number of the target block, and a degree of wear of the heavily worn block is higher than that of the lightly worn block; and the controller calculates a difference between the serial number of the target block and a serial number of a latest accessed block, and determines whether to move/copy the valid data of the target block into the heavily worn block or the lightly worn block according to the difference.

12. The memory device of claim 11, wherein the controller compares the difference with a threshold value to determine whether to move/copy the valid data into the heavily worn block.

13. The memory device of claim 12, wherein when the difference reaches the threshold value, the controller moves/copies the valid data into the heavily worn block.

14. The memory device of claim 11, wherein the controller compares the difference with a threshold value to determine whether to move/copy the valid data into the lightly worn block.

15. The memory device of claim 14, wherein when the difference is less than the threshold value, the controller moves/copies the valid data into the lightly worn block.

16. The memory device of claim 14, wherein the controller compares the difference with the threshold value to determine whether to move/copy the valid data into the heavily worn block.

17. A controller of a memory device, the controller being utilized for accessing a Flash memory, the Flash memory comprising a plurality of blocks, the controller comprising:

a read only memory (ROM) arranged to store a program code; and a microprocessor arranged to execute the program code to control the access to the Flash memory and manage the plurality of blocks, wherein the controller that executes the program code by utilizing the microprocessor selects a target block having a least erase count from at least one portion of blocks in a data region of the Flash memory, and utilizes the target block as a block to be erased, and serial numbers of the at least one portion of blocks correspond to order of last update of the at least one portion of blocks, respectively;

wherein the controller that executes the program code by utilizing the microprocessor determines whether to move/copy valid data of the target block into a heavily worn block or a lightly worn block according to a serial number of the target block, and a degree of wear of the heavily worn block is higher than that of the lightly worn block; and the controller that executes the program code by utilizing the microprocessor calculates a difference between the serial number of the target block and a serial number of a latest accessed block, and determines whether to move/copy the valid data of the target block into the heavily worn block or the lightly worn block according to the difference.

* * * * *